(12) United States Patent
Shah

(10) Patent No.: US 6,725,386 B1
(45) Date of Patent: Apr. 20, 2004

(54) METHOD FOR HIBERNATION OF HOST CHANNEL ADAPTORS IN A CLUSTER

(75) Inventor: Rajesh R. Shah, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 468 days.

(21) Appl. No.: 09/666,595

(22) Filed: Sep. 20, 2000

(51) Int. Cl.[7] .............................................. G06F 1/32
(52) U.S. Cl. ...................................................... 713/320
(58) Field of Search ................................ 713/300, 320, 713/323, 324

(56) References Cited

U.S. PATENT DOCUMENTS 5,440,690 A  *  8/1995  Rege et al. ................. 709/250
5,805,910 A  *  9/1998  Lee et al. ..................... 713/323
5,983,353 A  * 11/1999  McHann, Jr. ................ 713/310
6,459,705 B1 * 10/2002  Cheng ......................... 370/463

* cited by examiner

Primary Examiner—Thomas M. Heckler
(74) Attorney, Agent, or Firm—Christopher K. Gagne

(57) ABSTRACT

A method for causing a host channel adaptor which is involved with a clustered arrangement to hibernate. Before the HCA can hibernate, it is necessary for its clients to hibernate first. Once this is accomplished, all data is stored in memory and the HCA goes into hibernation. It resumes operation when a request is received. The HCA is checked to see if it has been changed and various parameters are examined to determine if an error has occurred which is unrecoverable. If not, the operation of the device is resumed.

17 Claims, 4 Drawing Sheets

METHOD FOR HIBERNATION OF HOST CHANNEL ADAPTORS IN A CLUSTER

FIELD

The present invention is directed to a method for hibernation of a computer system. More particularly, the present invention is directed to a method for hibernation of a host channel adaptor for a computer system included in a cluster arrangement.

BACKGROUND

In the computer field, many different types of platforms have been developed by different manufacturers which are not completely compatible with one another. Also, different operating systems which have been developed by different software companies may be utilized in similar platforms. As long as the individual equipment operates only by itself, this is never a problem. However, when systems must interact, it is necessary to have some architecture which allows for the different systems to interact.

While this is possible on a very large scale in an arrangement such as the internet, it is also desirable that it be available on a much smaller scale wherein small numbers of systems can operate together in a cluster. Various attempts have been made to provide such a subnetwork arrangement so that various computer systems and input/output arrangements can interact and work together.

Another capability which is desirable to have in a computer system is a sleep state. That is, if the system or parts of the system are not being utilized, it is desirable to remove power from these devices, to the extent possible. This lowers the amount of power being consumed which makes the operating cost of the system less and also means that less heat is being produced, which improves the operation of the device. In addition, it also means that the system is in an active state for a much shorter time, which reduces the "wear and tear" on the device. Some systems utilize various kinds of sleep states already. For example, the Windows 2000 system permits a sleep state. However, such systems do not typically describe how to utilize a sleep state for an individual system when it is connected in a cluster arrangement with other systems.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein.

DETAILED DESCRIPTION

Figure 1:
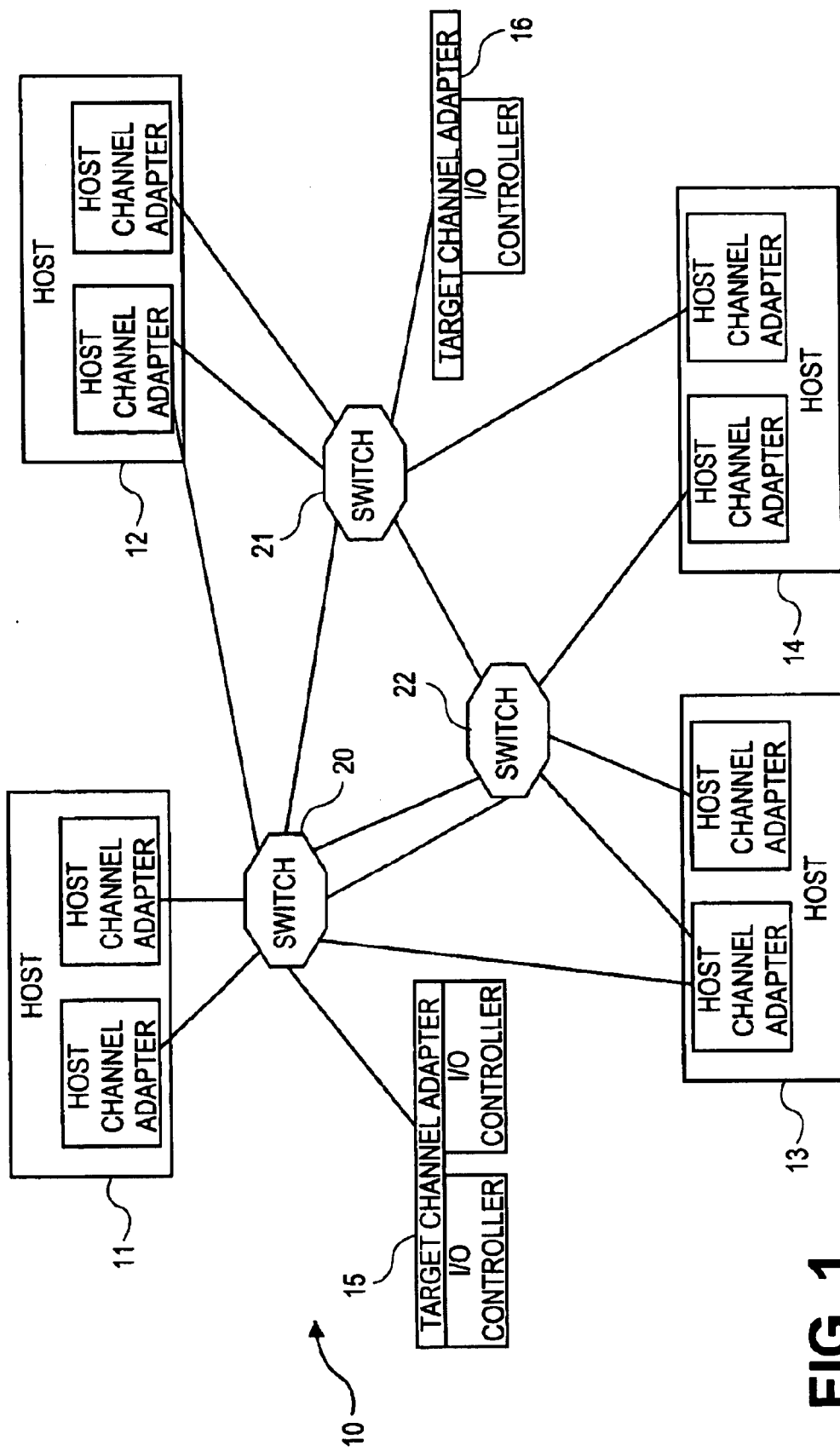
FIG. 1 is an example block diagram of an example cluster system having an advantageous arrangement.

Before beginning a detailed description of the subject invention, mention of the following is in order. When appropriate, like reference numerals and characters may be used to designate identical, corresponding or similar components in differing figure drawings. Further, in the detailed description to follow, example sizes/models/values/ranges may be given, although the present invention is not limited to the same. As a final note, well known power/ground connections to ICs and other components may not be shown within the FIGS. for simplicity of illustration and discussion, and so as not to obscure the invention. Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In an effort to form a cluster through which different systems can interact, an arrangement such as shown in FIG. 1 has been suggested. In this arrangement, a number of hosts and I/O devices have been interconnected using a series of switches. Thus, FIG. 1 shows the cluster arrangement 10 as including four hosts 11, 12, 13, 14, I/O enclosures 15 and 16 and three switches 20, 21 and 22. While the example shown in FIG. 1 includes four hosts, two I/O enclosures and three switches, in fact any number of similar devices may be combined in such a cluster. Each host is a computer system such as a server or other computer system. The I/O enclosures may support a simple device such as display or printer, or may involve a number of connections to other systems such as connections to networks through either metallic or fiber optic connections.

Each host and I/O enclosure contains at least one channel adaptor. This is a device which terminates a link to a switch of the cluster and thus is the device through which each system is connected to the cluster. When channel adaptors are part of a host system, they are referred to as host channel adaptors and when part of an I/O enclosure, they are referred to as target channel adaptors. Each host can have one or more host channel adaptors with each host channel adaptor (HCA) having one or more ports, and each port being connected to a different switch. This arrangement of switches and their connections to the various ports of the different channel adaptors is referred to as an interconnection fabric.

This arrangement of the cluster allows the individual channel adaptors to talk to the channel adaptors in other units through the switches and through the interconnection fabric. As a result, it is possible for different hardware and software arrangements from different providers to interact. The adaptors and switches utilize various protocols in order to make the various units compatible. The cluster arrangement is controlled by the use of a manager unit which keeps track of the topology of the fabric and assigns addresses to the various ports and controls how the data is switched. The manager may be one of the host systems as shown in FIG. 1 or may be a separate unit connected in a similar fashion.

Each host channel adaptor is controlled by a software device driver stack that runs under the host operating system. This driver stack is a collection of one or more device drivers and resides in a program within the host system. This driver stack provides the possibility of causing the host channel adaptor to hibernate and also to resume operations.

The hibernation operation is a sleep state where power is removed from all of the components of the system. When the hibernation is ended, the system must resume its operations where it left off. This is accomplished by storing the memory contents to disk, saving the registered state of all processors, saving the settings for applications and saving the hardware state of all I/O controllers and peripheral devices. Once power is restored, applications are resumed from the point where they left off. This is done in such a way that applications do not need to be re-launched and do not go through a new initialization sequence.

This is a difficult procedure when a host is involved with a cluster and connected through an interconnection fabric. It is necessary that every part of a system be put to sleep. Thus, it is necessary that all operations be stopped in a manner so that no data is lost. Thus, the present invention outlines a procedure that can be used to place a host in a hibernated state even while connected in a cluster arrangement. Also, the present method of hibernation can be used even if the host operating system for the host does not support the ability to hibernate the entire system. Thus, the HCA software stack can be utilized to control the hibernation rather than the host operating system. If the HCA is inserted in a hot-plug slot on a host system, the procedure can also be used to hibernate and power down just the HCA.

In addition to saving power, reducing heat and reducing wear and tear, the ability to hibernate allows a part of the system to be replaced while other parts of the cluster are active. Thus, it sometimes happens that one part of the hardware of a system is marginal or faulty. These components can be replaced with identical hardware while the system is in hibernation since all of the operating data is stored before hibernation. The present method provides a system for recognizing that new hardware has been installed and for allowing the switchover if it is possible.

Figure 2:
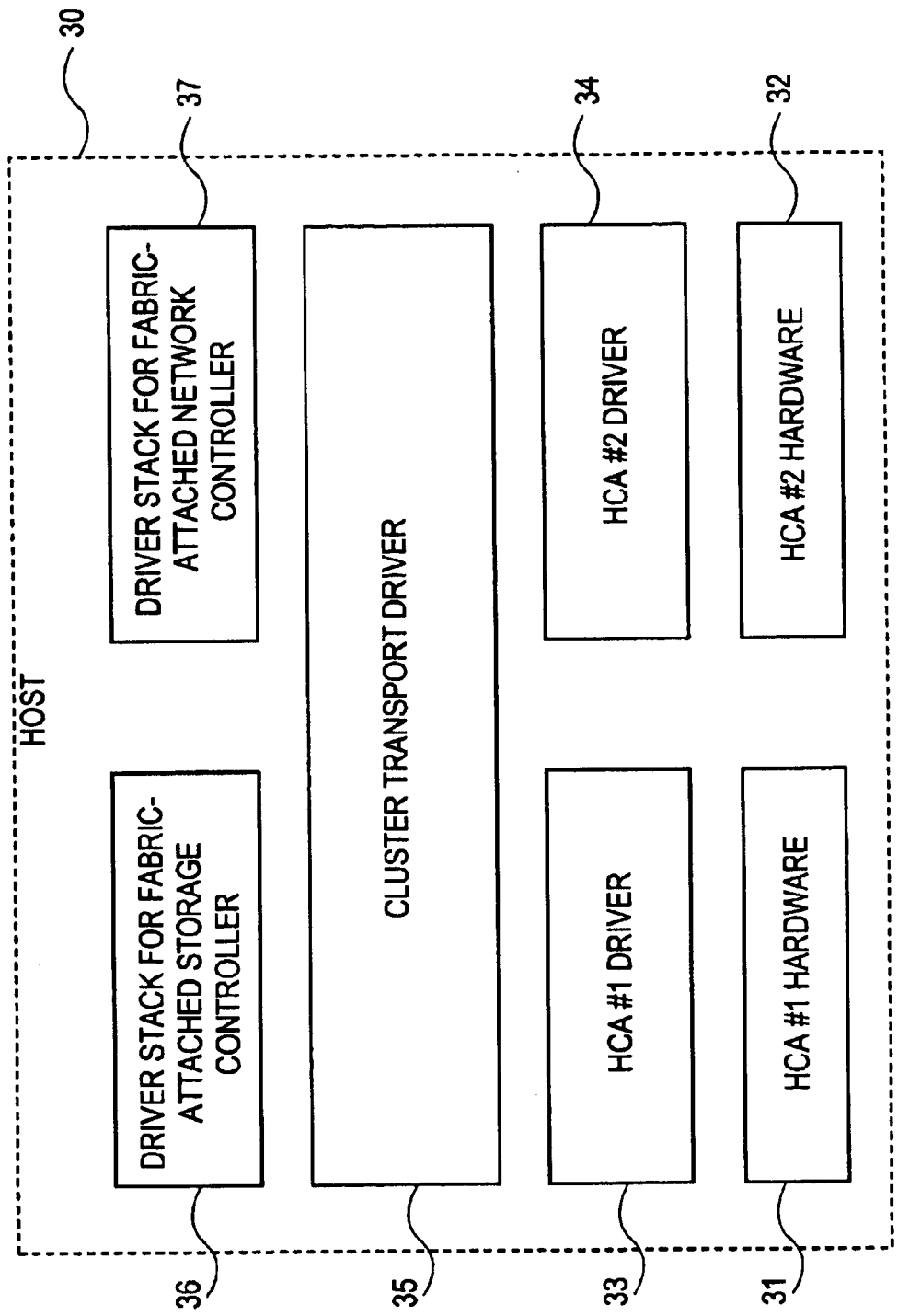
FIG. 2 is a diagram of a software arrangement for a host in an example system, such as shown in FIG. 1.

FIG. 2 shows an example of an arrangement of software within a host. The host 30 is shown as having two host channel adaptors including hardware for the first adaptor 31 and hardware 32 for the second adaptor. Each adaptor also has software 33 and 34 for controlling the adaptor hardware. The HCA drivers 33 and 34 take account of the register layout of their associated hardware and provide a procedure to save and restore the associated hardware state. Thus, each HCA driver manages hardware that is responsible for saving and restoring relevant hardware context before and after a hibernation procedure.

The cluster transport driver 35 is also included in the host and provides uniform and abstracted access to the HCA service for clients that use the services of the host. For example, FIG. 2 shows two such clients, a driver stack for fabric-attached storage controller 36 and the driver stack for fabric-attached network controller 37. The fabric-attached storage controller are input/output controllers that are attached to units up through the fabric. Thus, devices such as hard disks, tapes, CD ROMS, etc., can be attached to the storage I/O controller. The fabric-attached network controller connects to a local area network and provides an avenue to connect a cluster on one side to a local area network on the other side. Thus, when starting the hibernation procedure, it is necessary for the HCA to take into account the clients such as these two driver stacks which are connected to the host before hibernation can proceed.

The HCA driver operates in a fashion similar to other devices that are responsible for saving and restoring the hardware context upon hibernation. However, because of the interconnections through the cluster fabric arrangement, this type of HCA driver has additional responsibilities. First, the HCA driver must inform the subnet manager that it is going into hibernation. This informs the manager that it is being disconnected in an orderly manner rather than due to an error. In this way, the manager knows that the HCA will resume operations at some point in the future and will need to be reinitialized at that time. The manager reserves the local identifiers assigned to the HCA and will not assign them to any new HCA that is installed during hibernation. This is because the original HCA must be assigned the same local identifiers so that it can function without interruption when it resumes operation. If different local identifiers were assigned, the HCA driver would have to terminate all existing connections and existing clients. The manager must also keep forwarding entries for the hibernating HCA intact and switchboarding tables. This is so that the hibernating HCA may have the capability of coming out of hibernation automatically when a packet arrives for it. If switchboarding table entries were removed, it would mean that no packets could reach the hibernating HCA to wake it up.

When the HCA first comes out of hibernation, the HCA driver must first check to see if it can attempt to resume operations. First, it must check to see whether the HCA is the same one as before hibernation. That is, it may have been replaced by a new one of identical capability if the original was marginal or faulty. If they are different, the driver must determine whether there are differences and whether the differences can be managed. Some differences require the driver to immediately flag a non-recoverable error. This would be the case, for example, if an unknown HCA was built by a different manufacturer and the detected unimplemented functionality cannot be emulated.

If the two HCAs are different, but the differences are manageable, the driver must hide the differences between the two. Thus, if each port has a unique identifier and the HCA has a node identifier, identical HCAs from the same vendor will have different identifiers for the port and node. These identifiers are used to direct communication between units attached through a fabric and must be the same both before and after hibernation. Thus, if the HCA has been changed during hibernation, the driver must use the identifiers from the pre-hibernation unit, rather than the post-hibernation unit. Thus, when the subnet manager detects the operation of the HCA, and queries for the identifiers, the HCA driver must report the old ones. Thus, to the manager, it will appear it that the old unit has returned from hibernation. This will indicate to the manager that the local identifiers should be assigned as before hibernation. If for some reason, these cannot be assigned, an unrecoverable error is flagged. If the new HCA supports more capabilities than the old one, the driver must make sure that the old capabilities are provided as before and that clients using the existing HCA capabilities are not effected by the new capabilities. If the HCA driver is not able to restore the entire context to the pre-hibernation state, it must decide whether to fail to resume or to force some clients to reinitialize. For example, in some cases, where there is a connection to another unit at a remote end, the remote end may have attempted to communicate with the HCA and may have timed out if the HCA remained hibernated longer than the time out. In such a case, the remote client may have changed its situation and the HCA driver may not be able to fully restore the context to the pre-hibernation state. In this type of situation, the driver must decide if it should not resume operations or force the client to reinitialize. Should the driver issue an error status indicator, the entire system will fail to resume operations. On the other hand, if the driver successfully returns from hibernation, but forces some clients to reinitialize, the rest of the system can still also resume operations.

Figure 3:
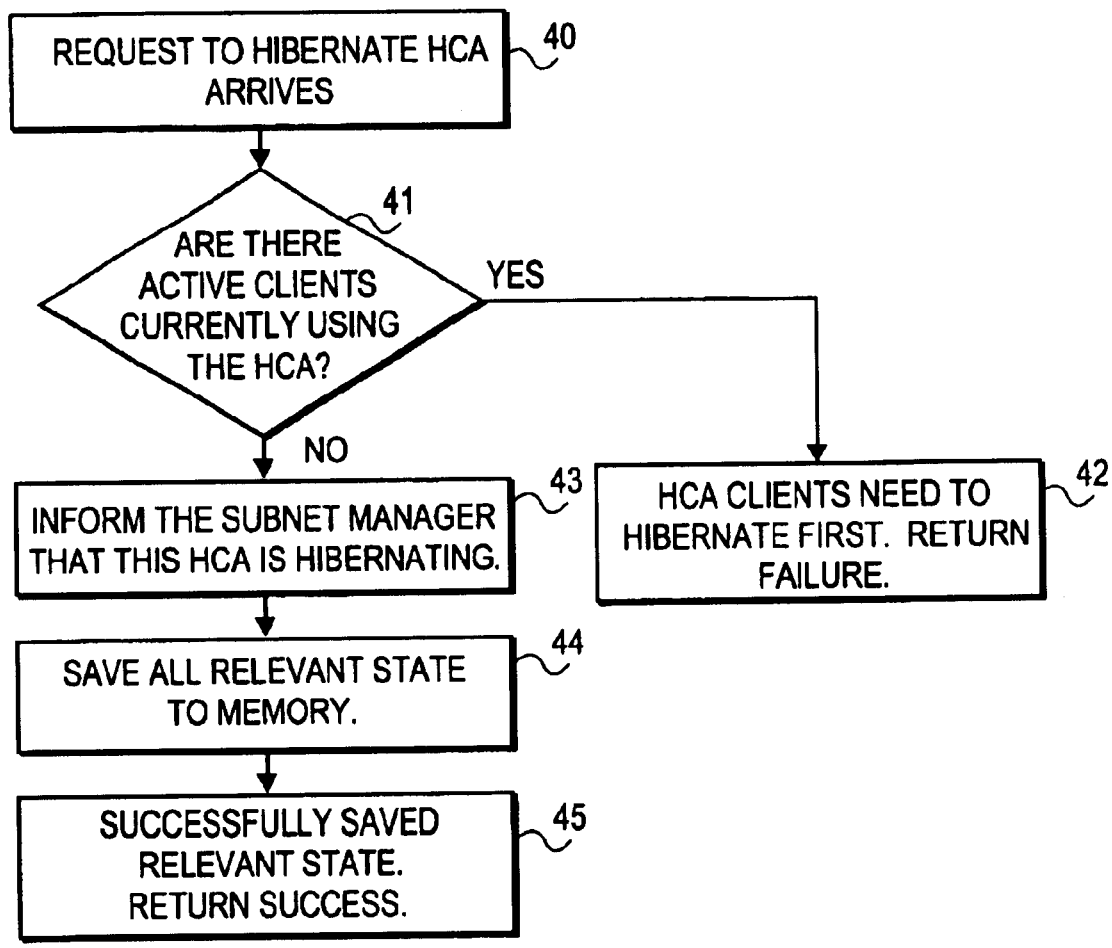
FIG. 3 is an example flow chart of an example system having an advantageous arrangement of the present invention.

FIG. 3 shows a flow chart of the steps used when a request to hibernate arrives. As indicated above, an HCA can go into hibernation only after its clients have also hibernated first. These specific clients are the kernel mode clients of the HCA and not just user mode applications that use the services indirectly. For example, FIG. 2 shows the direct clients of the driver as the cluster transport driver and the other fabric attached controllers. When the operating system issues a hibernation request, it does so in top down order. This means that the driver stacks for the storage and network drivers must go into hibernation first followed by the transport driver and then the HCA driver. This ascertains that the clients do not make HCA service requests while the driver is in the process of saving context and putting HCA to sleep. Accordingly, in FIG. 3, step 40 shows the arrival of the request to hibernate. In step 41, active clients are investigated to see if they are still using the HCA. If they are, these clients need to hibernate first and a failure is indicated as shown in step 42. If the active clients are not using the HCA, the manager is informed that this HCA will be hibernating as indicated in step 43. In step 44, the data is sent to memory. In step 45, a return success is indicated.

Figure 4:
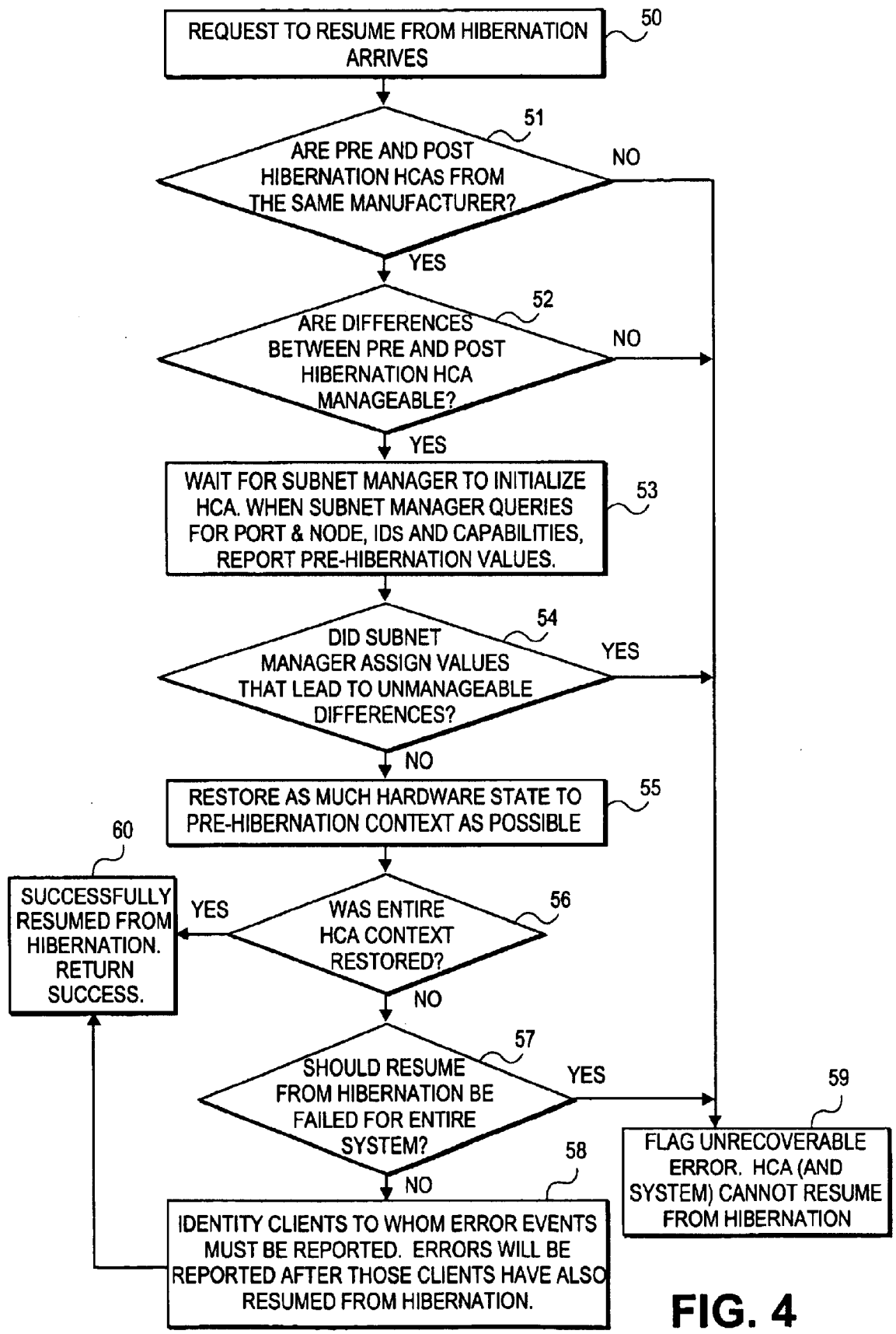
FIG. 4 is an example flow chart of an example system having an advantageous arrangement of the present invention.

FIG. 4 is a flow chart showing the steps executed by the driver when it resumes operation after hibernation. This procedure follows in the reverse or bottom up order. This means that the HCA driver is awakened first, followed by the transport driver and then the storage and network driver stacks. This ensures that HCA services are available when clients again resume operations.

Thus, FIG. 4 shows the arrival of the request to resume in step 50. In step 51, the HCAs are examined to see if they are from the same manufacturer. If not, an error is indicated in step 59. If they are the same, the differences are investigated in step 52. If the differences are manageable, the method proceeds to step 53. If not, an error is flagged in step 59. In step 53, the manager initializes the HCA. In step 54, the value is assigned by the manager or examined to see if differences have been generated. If they have been, an unrecoverable error is flagged in step 59. If not, the process proceeds to step 55 where the hardware state is restored. In step 56, the HCA is examined to see if the entire context was restored. If yes, a successful return is indicated in step 60. If not, step 57 examines whether the entire system should be failed or not. If yes, an unrecoverable error is flagged in step 59. If not, the clients are identified and a terminal error of events must be reported in step 58.

Thus, if a host needs to be hibernated in order for part of the hardware to be replaced, or if hibernation is desired in order to reduce power requirements, the HCA can cause a hibernation even if the host is involved with a cluster through an interconnection fabric. Upon restoring operation, a procedure is provided to determine if parts have been changed and how to handle the differences.

This concludes the description of the example embodiments. Although the present invention has been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the invention. In addition to variations and modifications in the component parts and/or arrangements, alternative uses will also be apparent to those skilled in the art.

What is claimed is:

1. A method of hibernating a host channel adaptor in a host connected in a cluster, comprising:
   determining that no active client currently is using said host channel adaptor;
   informing a subnet manager of said cluster that said host channel adaptor is hibernating;
   saving relevant state information to memory; and
   removing power from said host channel adaptor.

2. The method according to claim 1, further comprising:
   replacing at least part of the hardware of said host channel adaptor after removing power.

3. The method according to claim 1, further comprising restoring power to said host channel adaptor, retrieving said relevant state data from memory and resuming operation.

4. The method according to claim 1, wherein said host channel adaptor includes a host channel adaptor driver, a cluster transport driver and client controllers.

5. The method according to claim 4, wherein hibernation requests are issued in top down order.

6. A method for hibernating a host channel adaptor in a cluster comprising:
   removing power from said host channel adaptor to cause hibernation;
   receiving a request to resume operations;
   initializing the host channel adaptor by a subnet manager of said cluster;
   restoring hardware state to a pre-hibernation state from memory; and
   restoring operation of said host channel adaptor.

7. The method according to claim 6, further comprising:
   determining whether the pre-hibernation and post-hibernation host channel adaptor are the same.

8. The method according to claim 7, further comprising:
   determining whether differences between said pre-hibernation and said post-hibernation post channel adaptor are manageable.

9. The method according to claim 6, further comprising:
   determining whether the manager has assigned values with unmanageable differences.

10. The method stage according to claim 6, further comprising:
    determining whether a return from hibernation should be failed for the entire system if the entire host channel adaptor context was not restored.

11. The method according to claim 10, further comprising:

identifying clients to whom error events must be reported if the return from hibernation has not failed.

12. A method of replacing hardware within a host connected in a cluster arrangement, comprising:

requesting the hibernation of a host channel adaptor;
saving all relevant state data to memory;
removing power from said host;
replacing said hardware;
restoring power to said host;
restoring state data from memory;
resuming operation of said host channel adaptor.

13. The method according to claim 12, further comprising:

determining whether the pre-replacement hardware and post-replacement hardware are the same.

14. The method according to claim 13, further comprising:

determining whether differences between pre-replacement hardware and post-replacement hardware are manageable.

15. The method according to claim 12, further comprising:

determining whether a resume operation should be failed for the entire host if the entire host channel adaptor was not replaced.

16. A computer program stored on a computer readable memory for hibernating a host channel adaptor and a host connected in a cluster, the computer program comprising instructions that cause a computer to:

determine that no active client currently is using said host channel adaptor;

inform a subnet manager of said cluster that said host channel adaptor is hibernating;

save relevant state information to memory; and remove power from said host channel adaptor.

17. The computer program of claim 16, further comprising instructions that cause a computer to restore power to said host channel adaptor, retrieve said relevant state data from memory and resume operation.

* * * * *

UNITED STATES PATENT AND TRADEMARK OFFICE
CERTIFICATE OF CORRECTION

PATENT NO. : 6,725,386 B1
DATED : April 20, 2004
INVENTOR(S) : Shah

It is certified that error appears in the above-identified patent and that said Letters Patent is hereby corrected as shown below:

Column 4,
Line 64, delete the second occurrence of "it".

Signed and Sealed this

Twenty-ninth Day of June, 2004

JON W. DUDAS
*Acting Director of the United States Patent and Trademark Office*